(12) United States Patent
Vazny et al.

(10) Patent No.: US 8,180,310 B2
(45) Date of Patent: May 15, 2012

(54) FILTERING USING IMPEDANCE TRANSLATOR

(75) Inventors: Rastislav Vazny, Linz (AT); Krzysztof Dufrene, Plesching (AT); Hans Pletzer, Gramastetten (AT); Werner Schelmbauer, Steyr (AT); Harald Pretl, Schwertberg (AT)

(73) Assignee: Intel Mobile Communications GmbH, Neubiberg (DE)

( * ) Notice: Subject to any disclaimer, the term of this patent is extended or adjusted under 35 U.S.C. 154(b) by 409 days.

(21) Appl. No.: 12/419,873

(22) Filed: Apr. 7, 2009

(65) Prior Publication Data
US 2010/0255791 A1   Oct. 7, 2010

(51) Int. Cl.
*H04B 1/10* (2006.01)
(52) U.S. Cl. ......... 455/310; 455/24; 455/295; 455/307
(58) Field of Classification Search ............ 455/295, 455/24, 310, 311
See application file for complete search history.

(56) References Cited

U.S. PATENT DOCUMENTS

| | | | | |
|---|---|---|---|---|
| 3,824,496 | A | * | 7/1974 | Hekimian ............... 331/132 |
| 4,272,735 | A | * | 6/1981 | Cubbison, Jr. .......... 331/108 B |
| 5,434,541 | A | * | 7/1995 | Knoedl, Jr. ............... 330/306 |
| 7,400,203 | B2 | * | 7/2008 | Ojo et al. ................ 330/305 |
| 7,764,942 | B2 | * | 7/2010 | Bayruns ................... 455/334 |
| 2006/0079194 | A1 | * | 4/2006 | Tired et al. .............. 455/283 |
| 2006/0154635 | A1 | * | 7/2006 | Chan et al. ............... 455/280 |
| 2007/0001768 | A1 | * | 1/2007 | Kim et al. ................ 330/305 |
| 2008/0125073 | A1 | * | 5/2008 | Butaye et al. ............ 455/323 |
| 2008/0175307 | A1 | * | 7/2008 | Brunn et al. ............. 375/148 |
| 2008/0218273 | A1 | * | 9/2008 | Uehara et al. ............ 330/306 |
| 2008/0242245 | A1 | * | 10/2008 | Aparin ..................... 455/126 |
| 2009/0291652 | A1 | * | 11/2009 | Takemura ................. 455/118 |
| 2010/0007314 | A1 | * | 1/2010 | Ivie et al. ................. 323/210 |
| 2010/0097258 | A1 | * | 4/2010 | Koli ......................... 341/155 |

* cited by examiner

*Primary Examiner* — Thomas J Hiltunen
(74) *Attorney, Agent, or Firm* — SpryIP, LLC (57) ABSTRACT

This disclosure relates to low noise amplifiers (LNAs) and more particularly to LNAs integrated on integrated circuit (IC) chips along with radio frequency (RF) amplifiers.

19 Claims, 6 Drawing Sheets

FILTERING USING IMPEDANCE TRANSLATOR

BACKGROUND

Mobile communication devices, such as cellular telephones (hereinafter "cell phones"), have become ubiquitous in many parts of the world. Cell phones enable the user to communicate voice and other data signals between themselves, others, and various devices. The communications are typically full duplex communications in which the cell phone transmits a radio frequency (RF) signal conveying information to a base station and receives another RF signal from the base station which conveys certain other information to the cell phone. Thus cell phones host both an RF transmitter and an RF receiver. Accordingly, at least a portion of a typical cell phone (and other mobile communication devices) is referred to as an RF transceiver. Typically, the strength (as measured at the cell phone) of the RF signal transmitted from the cell phone is many dozens of decibels greater than the strength of the RF signal received by the cell phone.

Moreover, cell phones are typically hand held and many users value cell phones which possess small form factors. Thus, it is often the case that the transmitter portion of the cell phone and the receiver portion of the cell phone share an antenna. In the alternative, separate antennas may be used by these portions of a cell phone. Nonetheless, because of the small form factor of most if not all cell phones, some of the transmitted signal is likely to leak into the receiver of the cell phone. Moreover, the use of separate antennas increases the overall size of the cell phone as does adding circuitry to filter, compensate for, or otherwise eliminate the affects of the transmitted leakage signal. Other mobile communication device receivers similarly suffer from these affects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are techniques for filtering, if not eliminating, leakage signals from mobile communication device receivers and more particularly cell phone receivers. In one disclosed implementation, a radio frequency (RF) receiver is configured to receive an overall signal, filter a component at a transmission frequency from the overall signal, and amplify and output a component at a reception frequency. The techniques described herein may be implemented in a number of ways. One example environment and context is provided below with reference to the included figures and on going discussion.

Figure 1:
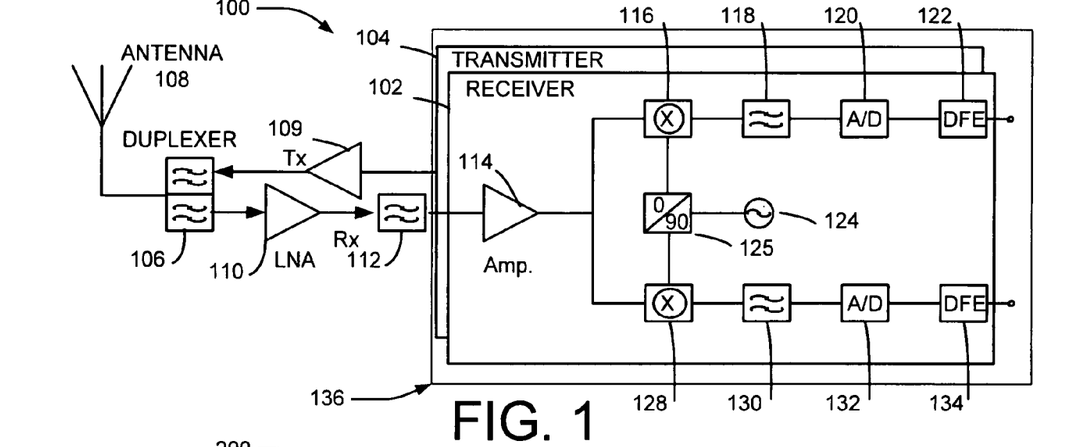
FIG. 1 is a block diagram of a cellular telephone transceiver.

FIG. 1 is a block diagram of a cell phone transceiver. The transceiver 100 contains a receiver 102, transmitter 104, a duplexer 106, an antenna 108, a transmitter amplifier 109, a receiver low noise amplifier (LNA) 110, and a filter 112. The transceiver 100 can be a portion of a universal mobile telephone system (UMTS), a global system for mobile communications (GMS), a code division multiple access (CDMA), a wide CDMA (W-CDMA), etc. device. Within the receiver 102, the transceiver 100 contains a conventional amplifier 114 (subsequent to LNA 110), an RF mixer 116, a filter 118, an analog to digital converter (ADC) 120, a decision feedback equalizer (DFE) 122, an oscillator 124, and associated phase shifter 125. These components 106, 110, 112, 114, 116, 118, 120, 122, 124, and 125 operate together in a conventional manner to receive RF signals, separate the base band signal (which conveys information) from other components of the overall received signal, and amplify and output the base band signal. More particularly, LNA 110 is situated close to the antenna 108 to amplify the received signal prior to the introduction of as many noise sources as is practicable. In situations in which it is desired to use a differential amplication system, the receiver 102 can include a second RF mixer 128, a second filter 130, a second ADC 132, and a second DFE 134 to amplify the desired signal in a differential mode and in a conventional manner.

Some of the components of the receiver 102 are shown as being integrated on a single integrated circuit (IC) chip 136. FIG. 1 also shows that some of the components of the transmitter 104 (not shown) can be integrated on the same IC chip 136 as are the components of the receiver 102. However, these components of the transmitter 104 and the receiver 102 can be integrated on different IC chips. The duplexer 106, antenna 108, LNA 110, and the filter 112 are shown as being hosted externally to the IC chip 136 by the transceiver 100. The external hosting of the duplexer 106, the antenna 108, and the filter 112 arises because of their relatively large physical size. Indeed, the physical size of the antenna 108 is determined in part by the desired transmission and reception frequencies (i.e., the transmission and reception wavelengths) of the transceiver 100. The physical size of the antenna 108 in part also determines the physical size of the duplexer 106. Thus, the duplexer 106 is also hosted externally from the IC chip 136.

The filter 112 can be either a bulk acoustic wave (BAW) or surface acoustic wave (SAW) filter which serves to filter certain components of the overall received signal from that received signal before these components reach the receiver 102. At least some of these components occur at the transmission frequency of the transmitter 104 although filtered components can occur at other frequencies. Typically, the filter 112 is hosted externally to the IC chip 136 also because, in part, because BAW and SAW filters can be large in comparison to the other components of the receiver 102.

In operation, transmitter 104 generates an RF signal which is communicated to transmitter amplifier 109. Amplifier 109 has a gain associated with it which amplifies the RF signal it receives from the transmitter 104. The amplified signal passes from the amplifier 109 to the antenna 108 for transmission. Since cell phone transceivers 100 typically use one antenna for both transmission and reception, the amplified signal passes through the duplexer 106 en route to the antenna 106, ideally, the duplexer 106 would completely isolate the receiver 102 from leakage of the transmitted signal into the receiver 102. However, in order to increase the degree of isolation provided by the duplexer 106, it is often necessary to increase the insertion losses associated with the duplexer 106. Thus, it is a common practice to tradeoff the degree of isolation and the insertion losses associated with the duplexer 106. Accordingly, typical duplexers only provide about 57 decibels of isolation between the antenna 106 and the receiver 102 during transmissions.

Figure 2:
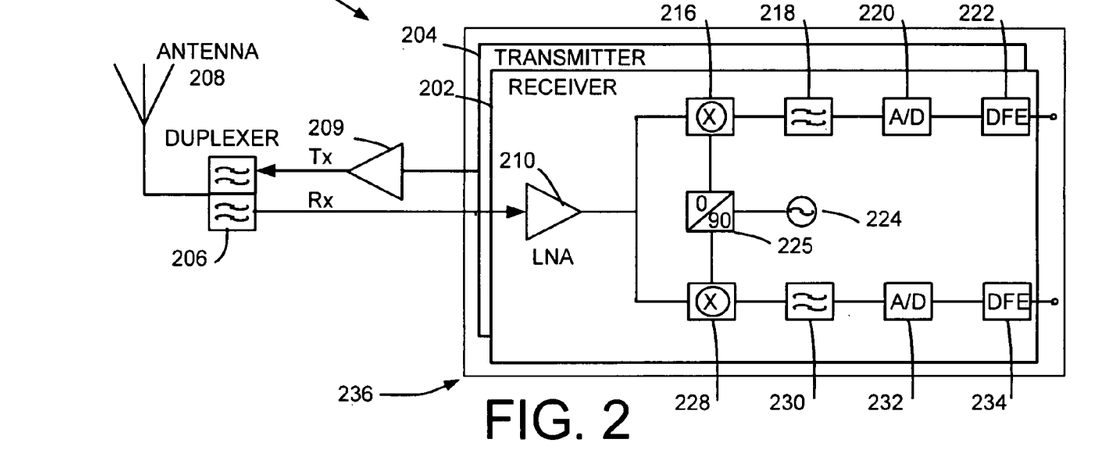
FIG. 2 is a bock diagram of an alternative cellular telephone transceiver.

Since some of the transmission signal will therefore leak into the reception path of the cell phone transceiver 100, filtering of that unwanted (in the receiver 102) transmission signal is desired. Otherwise the leaked transmission signal will appear as noise in the receiver 102. As a result, it is also a common practice to place the filter 112 in the reception path as early as is practicable. However, it is also desirable to place the first stage of amplification (i.e., low noise filter 110) as early in the transmission path as is practicable to reduce the amount of noise amplified as a result. Many cell phone transceiver 100 designs find a balance by placing the low noise amplifier 110 first and the filter 112 second in the reception path. These designs also add a second stage of amplification (i.e., low noise amplifier 114) to further boost the received signal once it is relatively free of noise (and particularly the leaked transmission signal). Thus, these designs provide some isolation at the duplexer 106 and some isolation at the filter 112. These designs also provide two stages of amplification. One stage amplifies the wanted signal (received by the antenna 106) and the unwanted and leaked transmission signal. The second stage amplifier 114 amplifies the received signal after it has been filtered. While this arrangement works relatively well, it is more complicated than desirable. FIG. 2 illustrates a cell phone transceiver 200 which eliminates some of the complexity associated with the cell phone transceiver 100.

FIG. 2 is a block diagram of another cell phone transceiver 200 of various implementations. The transceiver 200 contains a receiver 202, a transmitter 204, a duplexer 206, and an antenna 208. Transmitter 204 and antenna 208 are similar to those shown in transceiver 100 of FIG. 1. Instead of the externally mounted filter 112 and the two amplifiers 110 and 114, as illustrated in FIG. 1, cell phone transceiver 200 includes only the low noise amplifier 210 and no SAW or BAW filter (or any other filter) corresponding to filter 112. Furthermore, the duplexer 206 can even provide less isolation from the transmission signal for the receiver 202 than the duplexer 106 (see FIG. 1). Accordingly, the duplexer 206 can have less isolation losses associated with it then the duplexer 106. For a given receiver 204, therefore, the transmitted signal will be stronger than heretofore possible. In contrast to the cell phone transceiver 100, the cell phone transceiver 200 includes the low noise amplifier 210 which can provide all of the desired amplification of the received signal and which also provides isolation from the leaked transmission signal (and other noise). Thus, the receiver 204 of FIG. 2 features integrated selectivity.

Thus, in operation, antenna 208 receives an overall signal which might contain components that are transmitted by the transmitter 204 (i.e., the leakage signal) and possibly other noise. The duplexer 206 partially isolates the transmitter 204 and the receiver 202 from each other by filtering the leakage signal from the received signal. Thus, the duplexer 206 allows two-way communications via antenna 208. However, practicable duplexers 206 cannot entirely eliminate leakage of the transmitted signal into the receiver 202. Such signals within the receiver 202 are often referred to as "leakage signals."

With respect to the receiver 202, waveguides, cables, etc. within the transceiver 200 direct the received signal (including leakage components at the transmission frequency) from the duplexer 206 to the receiver 202. Within the receiver 202, the overall received signal is input to the LNA 210 which 1) provides isolation from the leakage signal and 2) selectively amplifies the components of the received signal which are at the reception frequency of the receiver 202. LNA 210 rejects components of the overall received signal which are at other frequencies (and, more particularly, those components which are at the transmission frequency). Thus, LNA 210 is centered on the reception frequency and, and selects signals at that frequency. LNA 210 also outputs the amplified components to the input of the mixers 216 and 228. The mixers 216 and 228 mix the amplified components (which are at the reception frequency) and recover the base band signal which was originally contained within the component of the overall received signal which is at the reception frequency. Components 218, 220, 222, 230, 232, and 234 of the receiver 204, which are subsequent to the mixers 216 and 228, further process the amplified components for ultimate presentation to a user (typically as audible signals) or to other components within the transceiver 200 (typically as digital signals).

Figure 4:
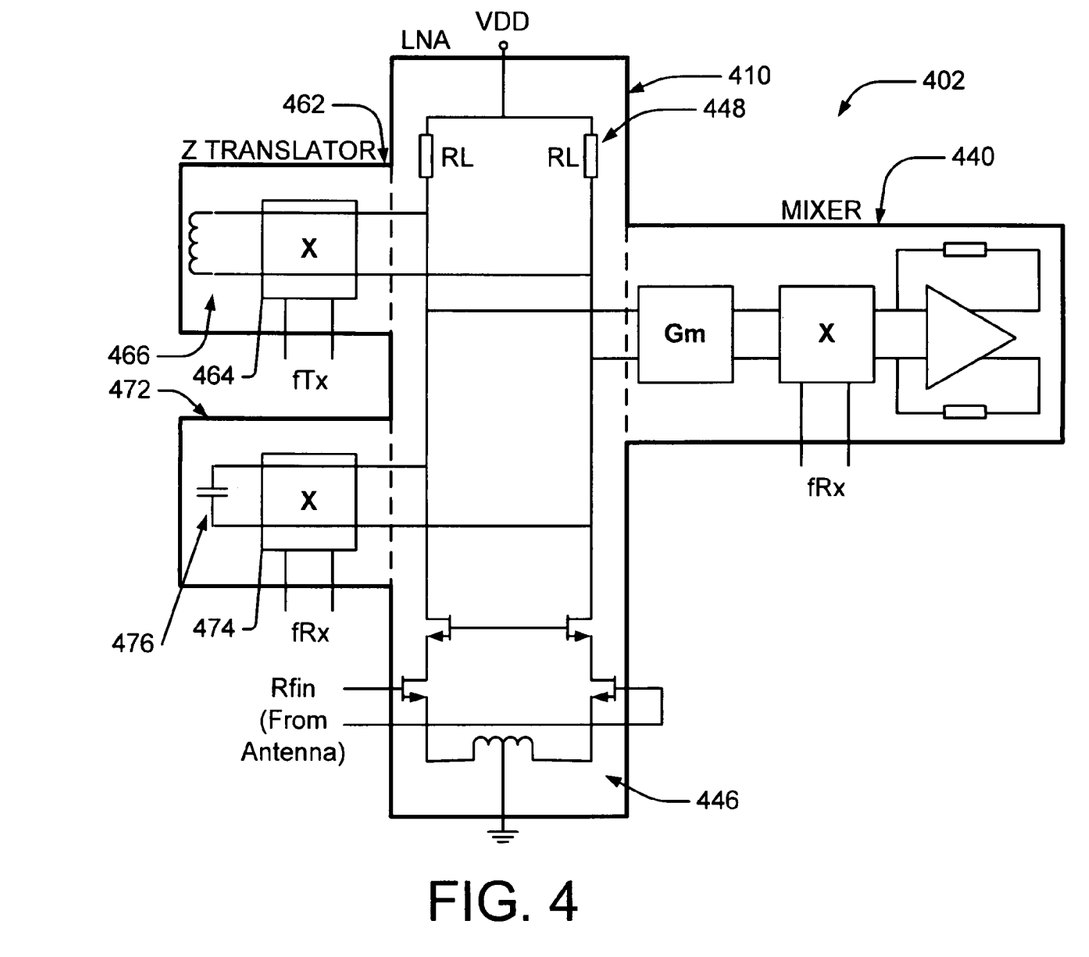
FIG. 4 is a schematic diagram of another cellular telephone receiver.
Figure 5:
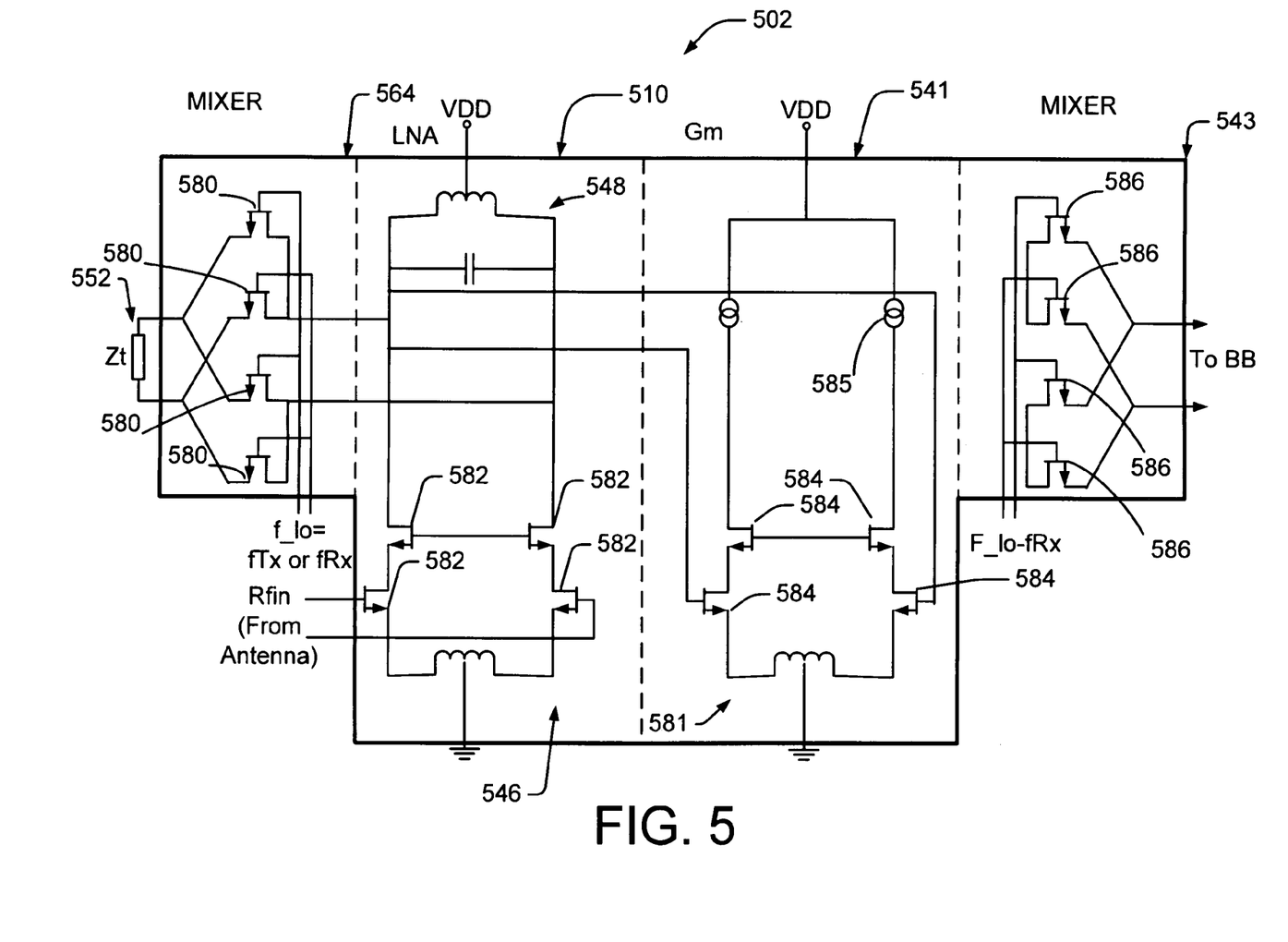
FIG. 5 is a schematic diagram of yet another cellular telephone receiver.

With continuing reference to FIG. 2, the LNA 210 can be used in a variety of applications. For instance, the LNA 210 can be incorporated in a cell phone or other mobile communication device, coupled to the antenna thereof (either directly or indirectly by a duplexer or other component), and used to selectively amplified components of the received signal. More particularly, FIGS. 3-5 illustrate some implementations of LNAs similar to LNA 210 in various cell receivers.

Figure 3A:
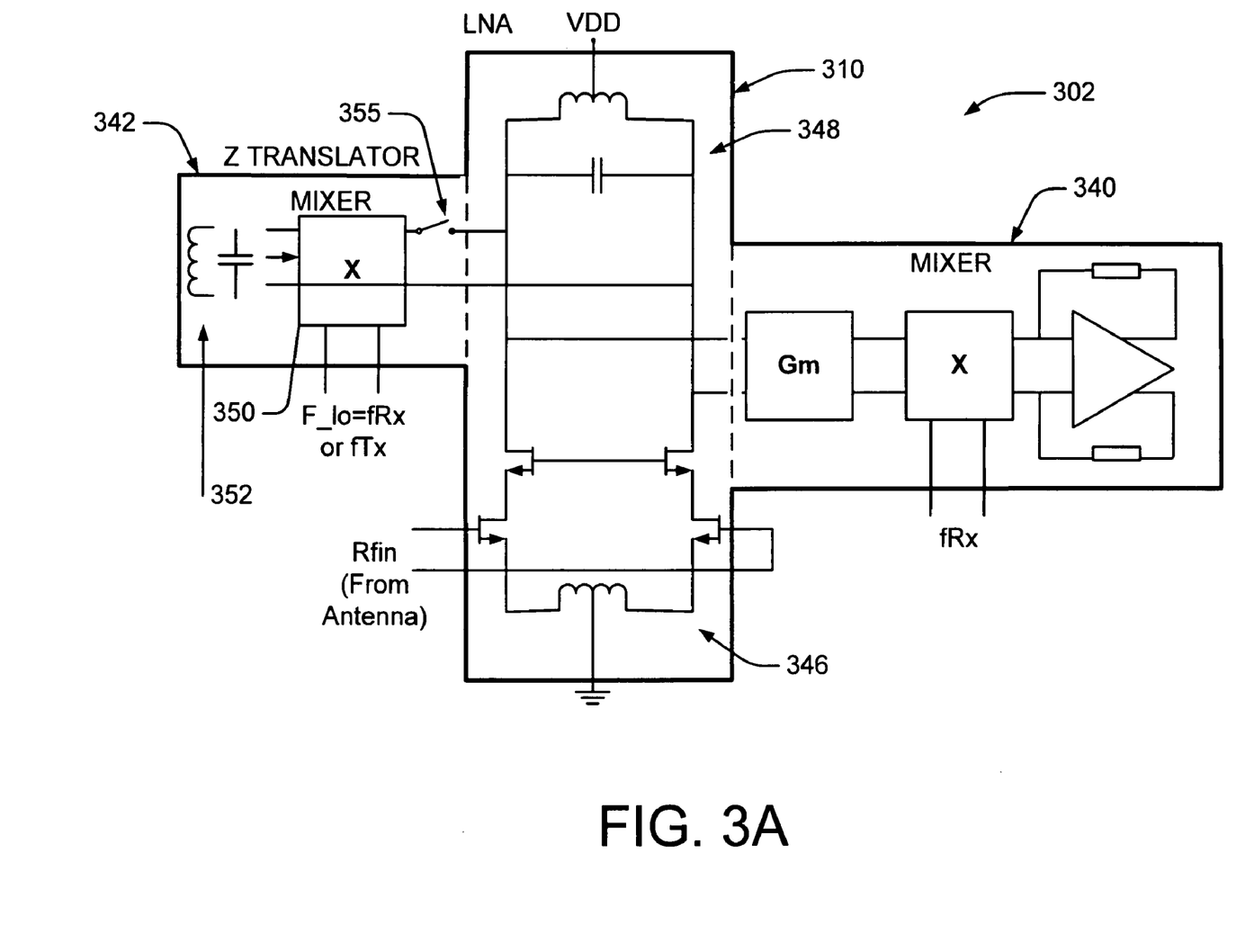
FIG. 3A is a schematic diagram of a cellular telephone receiver.

FIG. 3A shows a schematic diagram of a cell phone receiver of various implementations. The receiver 302 includes an LNA 310, a mixer 340, and an impedance translator 342. The mixer 340 accomplishes functions similar to components 216, 218, 220, 222, 224, 225, 228, 230, 232, and 234 of FIG. 2. With continuing reference to FIG. 3, LNA 310 includes amplifier 346 and a resonant circuit such as an LC tank 348. The amplifier 346 is configured to operate in the RF domain. The RF amplifier 346 and the LC tank 348 are wired in series between a power supply and ground. Furthermore, the LC tank 348 is configured to center the RF amplifier 346 on the reception frequency of the receiver 302. As shown, the RF amplifier 346 can be a degenerative cascode amplifier (containing metal-oxide semiconductor field-effect transistors) or it can be some other suitable type of amplifier such as a BJT (bipolar junction transistor) based amplifier. The mixer 340 can be connected across the output of the RF amplifier 346 to accept amplified components of the overall received signal and to further process the same.

With regard to the impedance translator 342 illustrated by FIG. 3A, it is connected in parallel with the LC tank 348 and serves to cause the receiver 302 to selectively amplify components of the overall received signal (which are at the reception frequency), to reject other signal components (notably, although not limited to, components at the transmission frequency fTx), or to perform both functions. More particularly, the impedance translator 342 contains a mixer 350 and a reactive component 352. As further indicated by FIG. 3A, the reactive component 352 can be either a capacitor or an inductor. The mixer 350 is connected to an alternating signal source and serves to translate the reactance to an impedance based on the frequency of the alternating signal.

The mixer 350 operates at either the transmission or reception frequency).as further disclosed herein. In some implementations which employ a polar modulation architecture for the cell phone's transmitter, the signal from the transmitter's local oscillator drives the mixer 350. Moreover, the transmitter's local oscillator signal can be phase modulated to account for differing delays associated with the mixer 350 and the low noise amplifier 310. Thus, the phase shifting can serve to keep the mixer 350 and the low noise amplifier 310 in phase with each other. In some embodiments, the mixer 350 is either a single mixer or a quadrature mixer.

When desired, the impedance translator 342 can be configured as a band pass filter. In such implementations, the reactive component 325 is a capacitor. More specifically, the reactive component 352 is a capacitor with a capacitance (i.e., reactance) selected so that the reactive component 352 and the mixer 350 (driven by a signal alternating at the reception frequency fRx) function as a band pass filter at the reception frequency fRx. Accordingly, any component at the reception frequency fRx of the overall signal received by the antenna (and subsequently input to the RF amplifier section of the LNA 310), is shorted by (i.e. passed through without attenuation) the reactive component 352 (here a capacitor) while unwanted signals are attenuated therein. As a result, the reactive component 352 and the mixer 350 center the LNA 310 on the reception frequency and cause it to reject signal components at the transmission frequency fTx (among other frequencies).

In the alternative, the impedance translator 342 can be configured as a notch filter. In such implementations, the reactive component 352 is an inductor. More specifically, the reactive component is an inductor with an inductance (i.e. reactance) selected so that the reactive component 352 and mixer 350 (driven by a signal alternating at the transmission frequency fTx) function as a notch filter centered on the transmission frequency fTx. Accordingly, the reactive component 352 and the mixer 350 cause the LNA 310 to pass the wanted signal component (at the reception frequency fRx) to the mixer 240 for subsequent processing. For similar reasons, the reactive component 352 and the mixer 350 attenuate the unwanted signal component at other frequencies (such as the leakage signal component). As a result, the LNA 310 of FIG. 3A selectively causes components at the reception frequency of the overall received signal to be shunted through the mixer 340, further amplified, and output accordingly.

In some implementations, the impedance translator 342 can contain a switch 355 connected between the mixer 350 and the LNA 310. The switch 355 can be controlled by a processor (or other component) of the cell phone so that when the transmitter (not shown) is inactive, the switch 355 is open. Thus, the switch 355 can prevent the impedance translator 342 from consuming power during periods when the transmitter is inactive. In some implementations, the switch 355 can be opened to isolate the impedance translator 342 when the component(s) at the transmission frequency fTx (and other frequencies other than the reception frequency fRx) of the overall received signal is below some selected value or threshold.

Figure 3B:
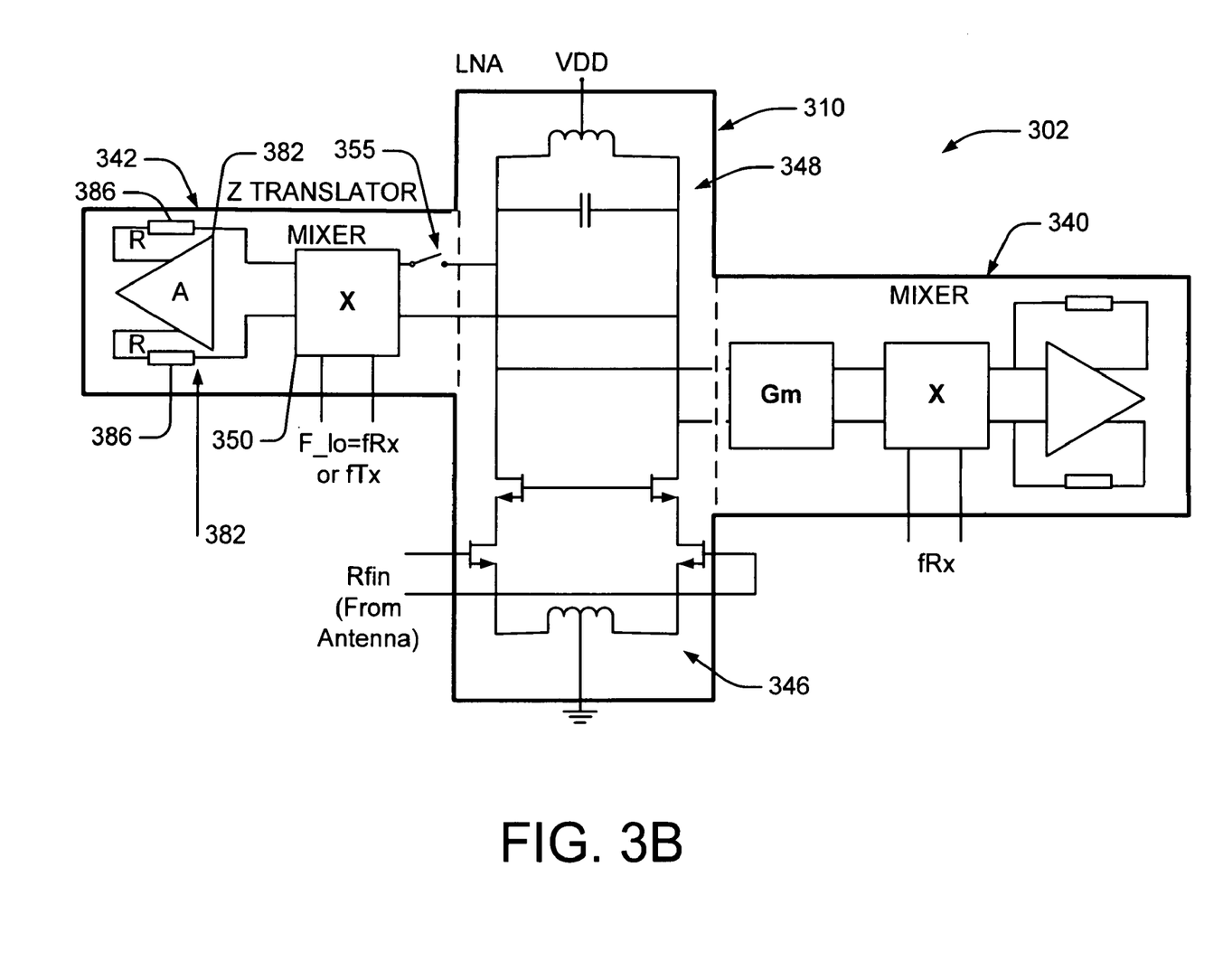
FIG. 3B is a schematic diagram of another cellular telephone receiver.

FIG. 3B is a schematic diagram of another cellular telephone receiver. In some implementations illustrated by FIG. 3B, the reactive component can be an inductor 382 fabricated using an active component configured to give rise to an impedance Zt. More particularly, the active inductor 382 can include an operational amplifier 384 with a gain of A and a pair of resistors 386 with resistance R interconnected as shown. This arrangement of the active inductor 382 and the mixer 350 gives rise to the impedance Zt with increasing offset frequency from 0 Hz. Nominally, with DC (direct current) signals, the impedance Zt is equal to R/A. Thus, when the gain is very high the impedance Zt is approximately 0 for DC signals. However, with increasing frequency, the gain A of the operational amplifier 384 decreases and therefore Zt rises. Accordingly, with AC signals of increasing frequency the impedance Zt increases. Accordingly, the operational amplifier 384 and resistors 386 emulate the behavior of an inductor. More particularly, at about 80 MHz the impedance Zt is approximately equal to the resistance R of the resistors 386. Thus, the active inductor 382 of such implementations can be actively controlled (by varying the frequency of the driving signal between, for example, the transmission and reception frequencies) to create an impedance Zt as desired. Moreover, the active inductor 382 can be integrated on the same IC chip as the other components of the receiver 302.

FIG. 4 illustrates another implementation of a cell phone receiver. The receiver 402 includes an LNA 410, a mixer 440, and two impedance translators 462 and 472. Impedance translators 462 and 472 are configured as, respectively, notch and band pass filters. Thus, impedance translator 462 contains an inductor 466 while impedance translator 472 contains a capacitor 476. Moreover, impedance translators 462 and 472 include mixers 464 and 474 which are driven by signals alternating at the transmission frequency fTx and the reception frequency fRx, respectively. Thus, inductor 466 and impedance translator 462 function as a notch filter centered on the transmission frequency fTx and absorb components of the overall received signal at the transmission frequency fTx. Furthermore, capacitor 476 and impedance translator 472 function as a band pass filter centered on the reception frequency fRx and shunting components of the overall received signal at the reception frequency fRx to subsequent stages for further processing. Accordingly, the inductor 466, capacitor 476, impedance translators 462 and 472, together in this implementation, center the LNA 410 on the reception frequency fRx and thereby cause the LNA 410 to selectively amplify signals at the reception frequency fRx while rejecting signals at the transmission frequency fTx. Of course, in some implementations, either the combination of the inductor 466 and the impedance translator 462 or the combination of the capacitor 476 and the impedance translator 472 can center the LNA 410 on the reception frequency fRx.

In some implementations, the LNA 410 can be fabricated without an LC tank or resonant circuit. Indeed, in some implementations, the LC tank is replaced with a resistive load 448. Since the resistive load 448 is resistive (i.e., contains no reactive components such as inductors or capacitors), the resistive load 448 can be fabricated on the same IC chip as the cascode amplifier 446 (or other type of amplifier) which the LNA 410 contains. As a result, these reactive components can be fabricated on the IC chip on which the remainder of the receiver 402 are integrated.

FIG. 5 is a schematic diagram of yet another cell phone receiver 502. More specifically, FIG. 5 illustrates a transistor-level implementation of a cell phone receiver 502. The receiver 502 is fabricated on an IC chip and contains a reactive component 552, a mixer 564, an LNA 510, a post-amplifier 541, and an RF mixer 543. The reactive component 552 has an impedance of Zt and can be capacitive or inductive. Moreover, the reactive component 552 (as translated to the RF domain by the mixer) centers the LNA 510 on the reception frequency fRx and causes the LNA 510 to reject received signal components at the transmission frequency fTx or both.

The mixer 564 translates the impedance Zt of the reactive component 552 to the RF domain. The mixer 564 also connects the reactive component 552 in parallel across the LC tank 548 (or the resistive load in some implementations) of the LNA 510. Moreover, the mixer 564 can contain transistors 580 which, in the implementation of FIG. 5, are similar to the p-type or n-type MOSFETs (metal-oxide semiconductor field-effect transistors) of the LNA 510, the post-amplifier 541, and the RF mixer 543. As illustrated, the mixer 564 accepts, and is driven by, a signal alternating at either the transmission frequency fTx or the reception frequency fRx depending on whether it is desired for the reactive component 552 and the mixer 564 to function as either a band pass filter or notch filter as disclosed herein.

With continuing reference to FIG. 5, the LNA 510 includes a cascode amplifier 546 and an LC tank 548. However, the LNA 510 could include other types of subcomponents such as a BJT based amplifier and a resistive load instead of the cascode amplifier 546 and the LC tank 548. Regardless of the types of subcomponents therein, the LNA 510 receives the overall RF signal (containing in some instances components at the transmission frequency fTx and components at the reception frequency fRx) and selectively amplifies the components thereof at the reception frequency fRx. As described herein, the reactive component 552 and the mixer 564 center the LNA 510 on the reception frequency fRx and cause the LNA 510 to reject signals at the transmission frequency fTx. Thus, the LNA 510 outputs the amplified components (at the reception frequency fRx) at its output for subsequent processing by the post-amplifier 541 and the RF mixer 543.

In the implementation illustrated by FIG. 5, the receiver 502 also contains the post-amplifier 541 as mentioned previously. The post-amplifier 541 includes another cascode amplifier 581 and a current source 585 connected in series between a power supply and ground. From its input, the post-amplifier 541 accepts the amplified components of the overall received signal and further amplifies them by a gain of Gm as illustrated. The post-amplifier 541 outputs the resulting amplified components to the RF mixer 543.

With regard to the RF mixer 543, it receives the amplified components (at the reception frequency fRx) from the post-amplifier 541 and mixes that signal with a signal alternating at the reception frequency fRx. As a result, the RF mixer 543 outputs a signal at the base band frequency (and a signal at the reception frequency fRx (caused by the interaction of the amplified components from the post-amplifier 541 and the driving signal of the RF mixer 543). Subsequently, additional filters (not shown) recover the baseband signal and forward it for presentation to the user typically as an audible signal(s) or to other components of the cell phone typically as a digital signal(s).

In some implementations, the transistors 580, 582, 584, and 586 of the mixer 564, the LNA 510, the post-amplifier 541, and the RF mixer 543 (respectively) can be the same type of transistors. For instance, the transistors 580, 582, 584, and 586 can all be p-type or n-type MOSFETs (as shown in FIG. 5) or some other type of transistors such as BJTs. Thus, all of the components 552, 564, 510, 541, 543, and the subcomponents thereof can be simultaneously fabricated on a single IC. However, the transistors 580, 582, 584, and 586 could be fabricated as different types of transistors.

Figure 6:
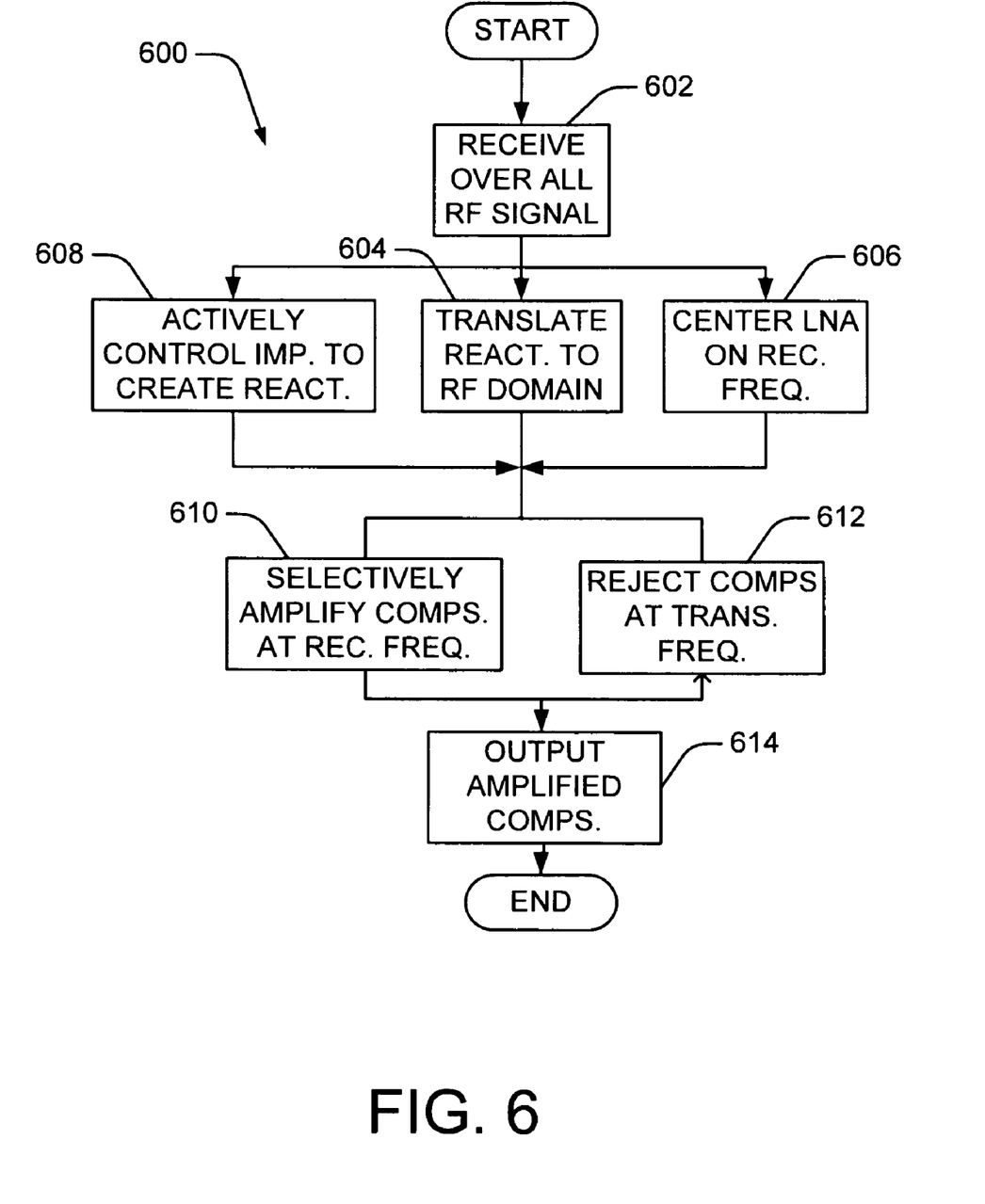
FIG. 6 is a flow chart illustrating a method of some implementations.

FIG. 6 is a flowchart illustrating a method of some implementations. More specifically, FIG. 6 illustrates the method 600 of receiving an RF signal using a receiver of a mobile communication device. The method 600 involves various steps such as step 602 at which an overall RF signal including components at the reception frequency fRx and transmission frequency fTx is received. At step 604, a reactance is translated to an impedance by a mixer. The translated reactance centers an LNA of the receiver at step 606. In some implementations, an impedance can be actively controlled to create the reactance as illustrated at step 608. The components of the overall RF signal which are at the reception frequency fRx are selectively amplified at step 610 while the components at the transmission frequency fTx are rejected at step 612. At step 614, the amplified components which are at the reception frequency fRx are output.

Implementations disclosed herein and variations thereof provide numerous advantages over mobile communication device receivers and, more particularly, conventional cell phone receivers. For instance, implementations provide LNAs with reactive components integrated on an IC chip along with the LNAs and along with the other components of the receivers. The integrated reactive components can center the LNAs on the reception frequency and can cause the LNA to reject signals at other frequencies (e.g., the transmission frequency of the cell phone). Moreover, some implementations allow the LNA to be fabricated with a resistive load (instead of an LC tank) and on a single IC chip along with other receiver components. Furthermore, implementations allow the receiver to be fabricated from transistors of one type (e.g., MOSFETs, BJTs, etc.) on a single IC Chip.

In operation, receivers of various implementations provide further advantages. For instance, receivers of various implementations exhibit reduced, if not eliminated, transmission leakage through the LNA to other stages of the receiver. Receivers of some implementations exhibit improved selectivity and improved noise rejection characteristics, particularly those related to noise at the transmission frequency. These receivers can also be implemented in one IC chip with resulting space and fabrication savings for the overall unit (e.g., cell phone) into which they are assembled. Receivers of various implementations feature integrated selectivity.

Specifics of exemplary methods are described herein. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the systems described could be configured as low noise amplifiers, receivers, transceivers, etc. of various types of mobile communication devices other than cell phones.

The invention claimed is:

1. A device including:
   a receiver having a low noise amplifier (LNA), the LNA comprising:
   an amplifier configured to operate in an RF domain, to receive an overall signal containing a component at a reception frequency and a component at a transmission frequency, to amplify the component at the reception frequency, and to output the amplified component at the reception frequency;
   a first load connected to the amplifier;
   a first mixer;
   a second reactive load connected to the first mixer, the first mixer and the second reactive load connected in parallel with the first load, the second reactive load having a reactance which when translated to an impedance by the first mixer either shorts the component at the reception frequency or presents an open circuit to the component at the transmission frequency; and a second mixer connected to the output of the amplifier and being configured to mix the amplified component and to output a resulting signal at a base band frequency;

a switch, the switch being configured to isolate the first mixer from the RF amplifier when a magnitude of the component at the transmission frequency is below a selected value; and an antenna in communication with the receiver.

2. The device as recited in claim 1 further comprising a transmitter connected to the antenna and being configured to transmit the component at the transmission frequency via the antenna.

3. The device as recited in claim 2 further comprising a duplexer connected to the antenna, the transmitter, and the RF amplifier, the duplexer being further configured to switch the antenna between being coupled to the transmitter or the RF amplifier.

4. The device as recited in claim 3 wherein the component at the transmission frequency is a leakage signal from the transmitter through the duplexer.

5. The device as recited in claim 3 wherein the receiver is a portion of one of a universal mobile telephone system (UMTS) device, a global system for mobile communications (GMS) device, a code division multiple access (CDMA) device, or a wide CDMA (W-CDMA) device.

6. A receiver comprising:
an amplifier to receive an overall signal containing a component at a reception frequency and a component at a transmission frequency, to amplify the component at the reception frequency, and to output the amplified component at the reception frequency;
a first load connected to the amplifier;
a mixer;
a second reactive load connected to the mixer, the mixer and the second reactive load connected in parallel with the first load, the second reactive load having a reactance which when translated to an impedance by the mixer either shorts the component at the reception frequency or presents an open circuit to the component at the transmission frequency; and
a switch, the switch being configured to isolate the mixer from the amplifier when a magnitude of the component at the transmission frequency is below a selected value.

7. The receiver as recited in claim 6, wherein the first load is a resonant circuit.

8. The receiver as recited in claim 6, wherein the first load is a resistive load.

9. The receiver as recited in claim 6 wherein the mixer is either a single mixer or a quadrature mixer.

10. The receiver as recited in claim 6, wherein the second reactive load is an inductor, the inductor and the mixer being configured as a band stop filter.

11. The receiver as recited in claim 10, wherein the inductor contains at least one active component.

12. The receiver as recited in claim 6, wherein the second reactive load is a capacitor, the capacitor and the mixer being configured as a band pass filter.

13. The receiver as recited in claim 6, wherein the RF amplifier is a cascode amplifier.

14. The receiver as recited in claim 6, wherein the reactance of the second reactive load and the mixer are centered on the reception frequency.

15. The receiver as recited in claim 6, further comprising an integrated circuit (IC) chip on which the RF amplifier, the first load, the mixer, and the second reactive load are integrated.

16. A method of receiving an RF signal comprising:
receiving an overall RF signal containing a component at a reception frequency and a component at a transmission frequency;
using a mixer to translate a reactance of a first reactive load to an impedance;
using the translated reactance to at least one of short the component at the reception frequency or to present an open circuit to the component at the transmission frequency;
amplifying the component at the reception frequency using an amplifier containing a second load and being configured to operate in the RF domain;
isolating the mixer from the amplifier when a magnitude of the component at the transmission frequency is below a selected value; and
outputting the amplified component at the reception frequency.

17. The method as recited in claim 16 wherein the using the translated reactance to at least one of short the component at the transmission frequency or to present an open circuit to the component at the reception frequency further comprises using the translated reactance to short the component at the transmission frequency and to present an open circuit to the component at the reception frequency.

18. The method as recited in claim 16 further comprising actively controlling the first reactive load to create the reactance.

19. The method as recited in claim 16 further comprising centering the reactance of the first reactive load and the mixer on the reception frequency.

* * * * *